United States Patent
Youtz et al.

(10) Patent No.: US 9,838,856 B1
(45) Date of Patent: Dec. 5, 2017

(54) SMS DOMAIN PREFERENCE

(71) Applicant: Verizon Patent and Licensing Inc., Arlington, VA (US)

(72) Inventors: Andrew E. Youtz, Princeton, NJ (US); Siva Sandeep Dhandu, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

(21) Appl. No.: 15/150,521

(22) Filed: May 10, 2016

(51) Int. Cl.
*H04W 4/00* (2009.01)
*H04W 4/14* (2009.01)
*H04J 11/00* (2006.01)
*H04W 72/04* (2009.01)
*H04W 64/00* (2009.01)
*H04L 29/12* (2006.01)
*H04W 88/16* (2009.01)
*H04W 80/04* (2009.01)

(52) U.S. Cl.
CPC ............... *H04W 4/14* (2013.01); *H04J 11/00* (2013.01); *H04L 61/1588* (2013.01); *H04W 64/00* (2013.01); *H04W 72/042* (2013.01); *H04W 72/048* (2013.01); *H04W 80/04* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2011/0021216 A1* | 1/2011 | Pudney | H04W 4/12 455/466 |
| 2012/0134351 A1* | 5/2012 | Ewert | H04L 12/581 370/338 |
| 2014/0016614 A1* | 1/2014 | Velev | H04W 4/005 370/331 |
| 2014/0128113 A1* | 5/2014 | Zisimopoulos | H04W 4/14 455/466 |

* cited by examiner

*Primary Examiner* — Erika Washington (57) ABSTRACT

A method may be performed by a network device. The method may include conducting an attachment procedure with a wireless device, wherein the conducting forms a session between the wireless device and the core network; associating the wireless device with a short message service (SMS) capability for the session, wherein the SMS capability indicates whether the wireless device can process SMS messages via Internet protocol Multimedia Subsystem (IMS) protocols; identifying an SMS message intended for an application residing on the wireless device; routing the SMS message via IMS protocols when the SMS capability of the wireless device indicates the wireless device can process IMS protocols; and routing the SMS message via non-access stratum (NAS) protocols when the SMS capability of the wireless device indicates the wireless device cannot process IMS protocols.

20 Claims, 11 Drawing Sheets

SMS DOMAIN PREFERENCE

BACKGROUND

Many mobile services are heavily-dependent on short message service (SMS) for internal operations, remote device configurations, and information procedures. Standards for 3rd Generation Partnership Project (3GPP) networks, such as Long-term Evolution (LTE) standards, are migrating to the use of Internet protocol Multimedia Subsystem (IMS)-based services to support SMS. However, other aspects of LTE networks may continue to support SMS delivery for legacy devices and data-centric devices that do not have IMS capabilities.

DETAILED DESCRIPTION OF PREFERRED EMBODIMENTS

The following detailed description refers to the accompanying drawings. The same reference numbers in different drawings may identify the same or similar elements.

Use of Short Message Service (SMS) messages for application wake-up is typical for wireless user devices on some service provider networks. In Long-term Evolution (LTE) networks that use Internet protocol Multimedia Subsystem (IMS)-based voice services, IMS may be used for both voice calls and SMS messages for user devices. However, use of SMS over IMS may not be an optimal implementation for wireless devices that do not support voice services (such as tablets, gaming systems, USB modems, mobile hotspot devices, and machine-type communication devices like point-of-sale systems, vending machines, automated teller machines (ATMs), meters, vehicle diagnostics and telematics devices, etc.). Even though these wireless devices do not support voice services, the devices must still be equipped with an IMS client to enable receiving SMS wake-up messages.

For devices without an IMS client, non-access stratum (NAS) protocols may be used to send and receive SMS messages, such as application wake-up messages. Selective use of SMS over NAS in cellular networks can allow the IMS client function to be eliminated from certain wireless devices, reducing device cost, complexity, and testing. Introducing the option of different SMS delivery methods (i.e., SMS via IMS or SMS via NAS) into a network also necessitates a mechanism by which wireless devices can inform the network of which kind of SMS delivery methods the user device can use to send and/or receive SMS messages. Systems and methods described herein enable network devices, such as the mobility management entity (MME) of an evolved packet core (EPC) network, to be informed of a device's SMS-sending/receiving capabilities at the time the device attaches to the network.

According to one implementation, a method may be performed by a network device, such as an MME. The method may include conducting an attachment procedure with a wireless device to form a session between the wireless device and a core network. The method may also include associating the wireless device with an SMS capability for the session. The SMS capability may indicate whether the wireless device can process SMS messages via IMS protocols. The method may further include identifying an SMS message intended for an application residing on the wireless device, routing the SMS message via IMS protocols when the SMS capability of the wireless device indicates the wireless device can process IMS protocols, and routing the SMS message via NAS protocols when the SMS capability of the wireless device indicates the wireless device cannot process IMS protocols.

Figure 1:
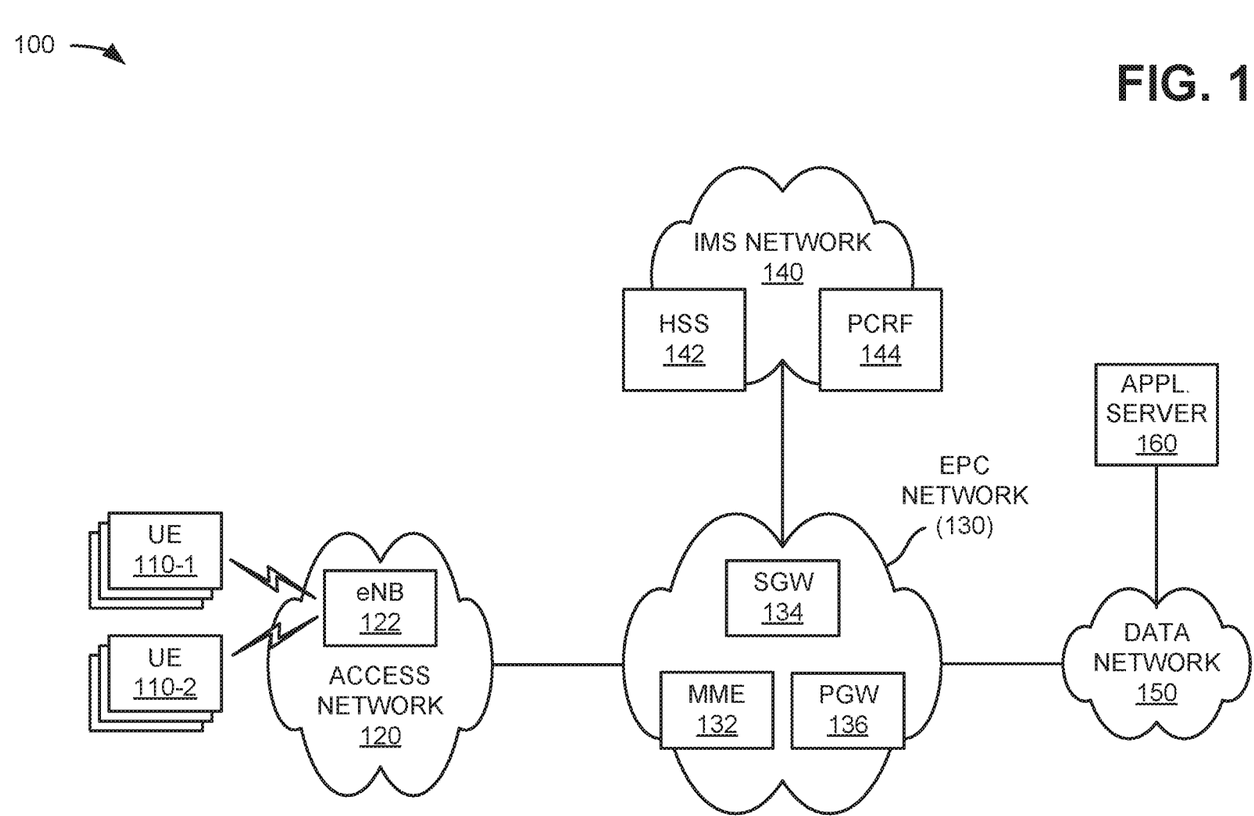
FIG. 1 depicts an exemplary network in which systems and/or methods described herein may be implemented.

FIG. 1 is an exemplary network 100 in which systems and/or methods described herein may be implemented. As illustrated, network 100 may include user equipment (UE) 110-1 and 110-2 (referred to herein collectively and generically as "UE 110"), an access network 120, an evolved packet core (EPC) network 130, an IP multimedia subsystem (IMS) network 140, a packet data network (PDN) 150, and an application server 160. Access network 120 may include a base station 122 (also referred to as an enhanced NodeB (eNB) 122). EPC network 130 may include a mobility management entity (MME) 132, a serving gateway (SGW) 134, and a packet data network (PDN) gateway (PGW) 136. IMS network 140 may include a home subscriber server (HSS) 12 and a policy and charging rules function (PCRF) 144. Devices and/or networks of network 100 may interconnect via wired and/or wireless links.

UE 110 may include computational or communication device that is capable of communicating over access network 120, EPC network 130, IMS network 140, and/or PDN 150. UE 110 may also be referred to herein as a "wireless device." UE 110 may include, for example, a radiotelephone, a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a machine-type communications (MTC) device, or other types of computation or communication devices. In implementations described herein, UE 110 may include a local application that receives data from an application server (e.g., application server 160) via access network 120. As described further herein, UE 110-1 may include an NAS software stack that can receive SMS messages via NAS protocols, but may not include an IMS client. In contrast, UE 110-2 may include a device equipped with an IMS client that can accept SMS messages using IMS protocols.

Access network 120 may include a wireless communications network that connects subscribers' devices (e.g., UE 110) to a service provider (e.g., EPC network 130). In one example, access network 120 may include a long-term evolution (LTE) network. In other implementations, access network 120 may employ other wireless network standards such as 3rd Generation Partnership Project (3GPP) 4G standards, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or future wireless access network standards. Generally, access network 120 may include a radio access network capable of supporting high data rate, low latency, packet optimization, large capacity and coverage, etc. Terminology used herein may refer to particular network standards, such as LTE, for simplicity, but is not intended as a limitation to any particular wireless standard.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other mobile devices 110. In one implementation, eNB 122 may combine the functionalities of a base station and a radio network controller (RNC) provided in 2G or 3G radio access networks.

EPC network 130 may include core network architecture of the 3GPP LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140. EPC network 130 may also employ NAS protocols to support control plane communication between UE 110 and MME 132, such as attach signaling, tracking area updates, authentication, and security. According to implementations described herein NAS protocols may also be used to support delivery of SMS messages for some UE 110.

MME 132 may include one or more computational and/or communication devices that are responsible for idle mode tracking and paging procedures (e.g., including retransmissions) for UE 110. MME 132 may be involved in a bearer activation/deactivation process (e.g., for UE 110) and may choose a SGW (e.g., SGW 134) for UE 110 at an initial attach and at a time of intra-LTE handover. MME 132 may provide a control plane function for mobility between LTE and different access networks (e.g., a different access network 120/eNB 122).

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one implementation, SGW 134 may route and forward user data packets, may act as a mobility anchor for a user plane during inter-eNB handovers, and may act as an anchor for mobility between LTE and other 3GPP technologies. SGW 134 may include a local resource timer to manage network resources. SGW 134 may manage and store contexts associated with UE 110 (e.g., parameters of an IP bearer service, network internal routing information, etc.).

PGW 136 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 136 may provide connectivity of UE 110 to external packet data networks (PDNs, e.g., PDN 150) by being a traffic exit/entry point for UE 110. UE 110 may simultaneously connect to more than one PGW 136 for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services. Generally, IMS network 140 may manage authentication, security and/or protection protocols, session initiation protocols, account information, network policy enforcement, subscriber profile information, etc. associated with UE 110.

HSS 142 may store information associated with a subscriber, services that the subscriber has requested or been assigned and settings (e.g., quality of service, service priority, authorized service category, admission control level for authorized service category, charging and policy rules, etc.) associated with the services, and/or a current location of the subscriber. Furthermore, HSS 142 may verify a subscriber's identity, authenticate and/or authorize UE 110 using a device identification number (e.g., by performing international mobile subscriber identity (IMSI) or media access control (MAC) authentication), authorize a particular service, and/or track consumption of network resources for a particular subscriber. HSS 142 may provide the subscriber information to MME 132, including the authorized services service categories, and/or admission control level, during the device authentication and authorization process when UE 100 requests initial network attachment. In one implementation, HSS 142 may track whether a device associated with a subscriber profile includes IMS capabilities and provide that information to MME 132 as part of, for example, a PDN connection authorization process.

PCRF 144 may include one or more devices that perform operations to enforce network policies associated with a communication session with UE 110. In one example implementation, PCRF server 134 may perform operations that enforce EPS policies associated with a call session with UE 110. For example, PCRF server 134 may obtain (e.g., from HSS 142) a subscriber profile that identifies services (e.g., a prepaid voice service, a prepaid data service, a postpaid voice service, a postpaid data service, a prepaid VoIP service, SMS service, etc.) to which a user, associated with UE 110, has subscribed.

PDN 150 may include one or more wired and/or wireless networks. For example, PDN 150 may include the Internet, a public land mobile network (PLMN), and/or another network. Additionally, or alternatively, PDN 150 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Application server 160 may include one or more server devices, or other types of computational or communication devices that provide applications, data, and/or services to UE 110. In one example, application server 160 may provide downlink data for use by a particular application residing on UE 110.

In FIG. 1, the particular arrangement and number of components of network 100 are illustrated for simplicity. In practice there may be more UEs 110, access networks 120, EPC networks 130, IMS networks 140, PDNs 150, or application servers 160. For example, there may be thousands or millions of mobile devices 110.

Figure 2:
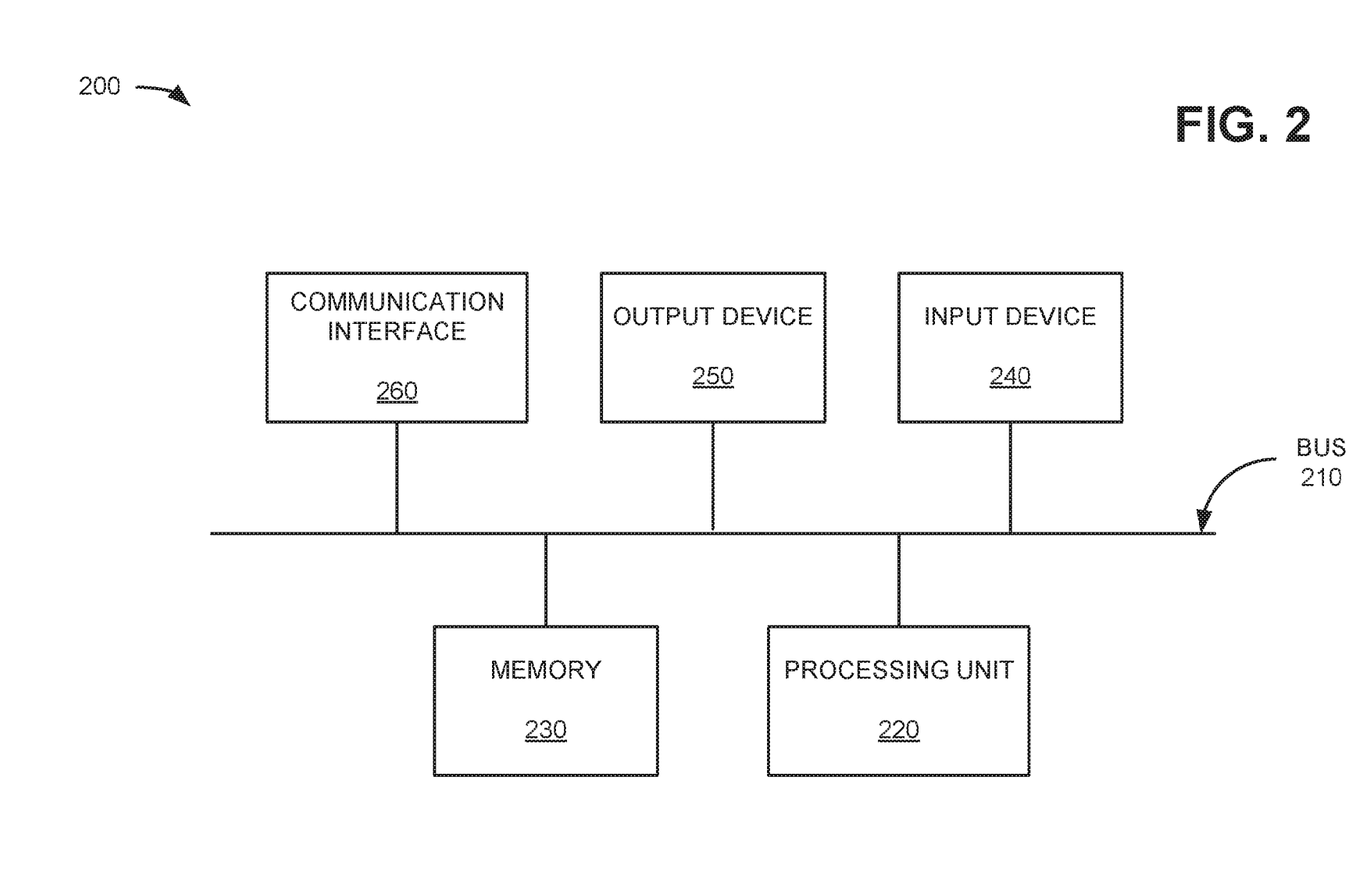
FIG. 2 is a diagram of exemplary components of a device that may correspond to one of the devices of the network depicted in FIG. 1.

FIG. 2 is a diagram illustrating exemplary components of a device 200. Each of UE 110, eNB 122, MME 132, SGW 134, PGW 136, HSS 142, PCRF 144, and application server 160 may be implemented/installed as a combination of hardware and software on one or more of device 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
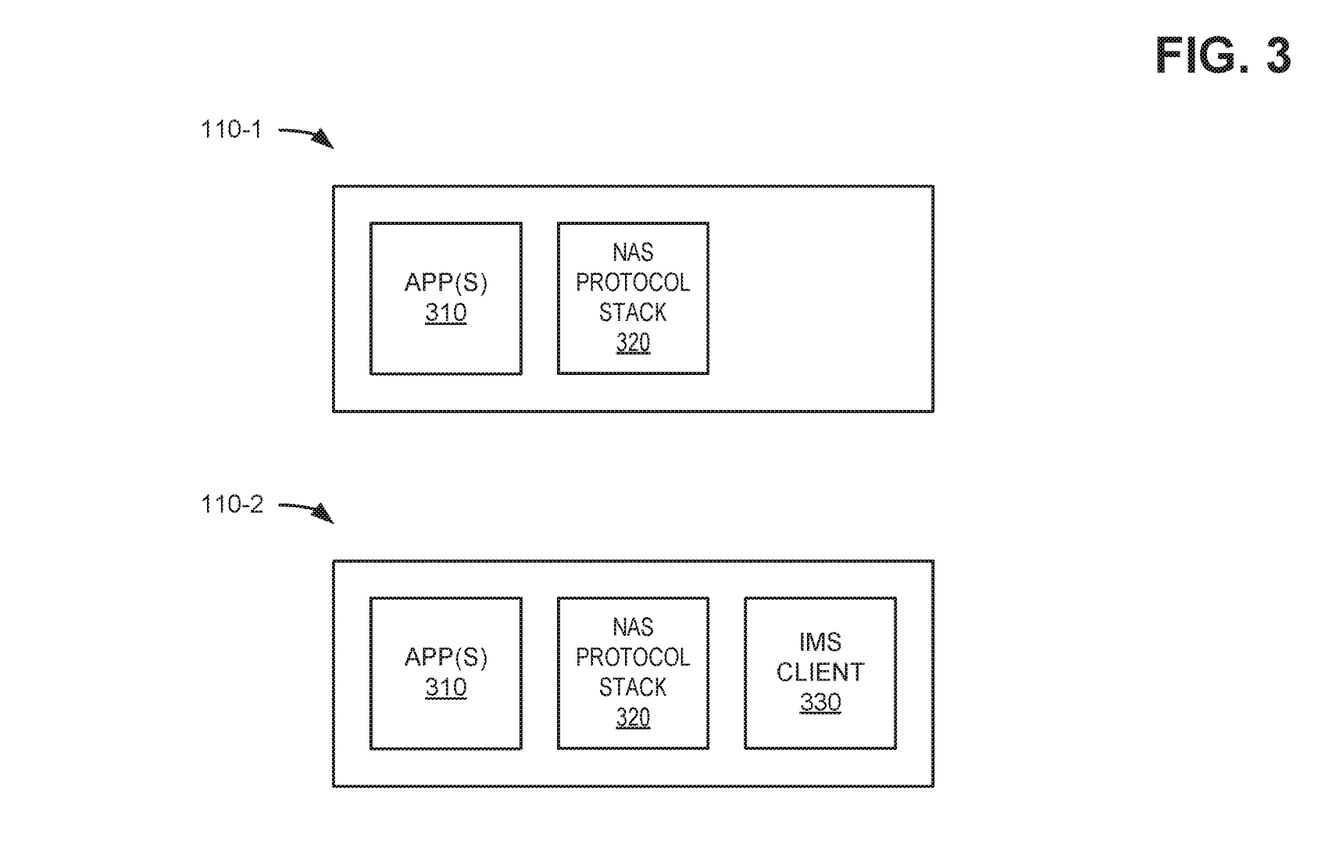
FIG. 3 illustrates exemplary components of wireless devices of the network of FIG. 1.

FIG. 3 illustrates block diagram of exemplary components of UE 110-1 and UE 110-2, both of which may be implemented using one or more components of device 200 (FIG. 2). Some or all of the blocks of FIG. 3 may be included, for example in memory 230 and executed by processor 220. UE 110-1 may represent a wireless communication device that does not support voice services, such as a tablet device, a USB modem, a mobile hotspot device, or a MTC device. UE 110-2 may represent a wireless communication device that supports voice services. As shown in FIG. 3, UE 110-1 may include one or more applications 310 and an NAS protocol stack 320, while UE 110-2 may include applications 310, NAS software stack 320, and an IMS client 330.

Referring collectively to UEs 110-1 and 110-2, application 310 may generally include any application that requires SMS or text messages for application wake-up to receive data from application server 160. Applications 310 may include, for example, social media apps, games, email/browser apps, speech recording apps, video camera apps, location/navigation apps, visual voicemail apps, SMS/MMS/text apps, etc.

NAS protocol stack 320 generally is used to convey non-radio signaling between UE 110 and MME 132 for access to EPC network 130. More particularly, NAS protocol stack 320 may permit exchange of control signals between UE 110 and MME 132. According to an implementation described herein, NAS protocol stack 320 may designate a new information element (IE) within an attach request message and/or tracking area update (TAU) request message. The new IE, referred to herein as a "SMS domain preference IE" may identify a UE capability as one of four configurations: (1) capable of receiving SMS via NAS only, (2) capable of receiving SMS via IMS only, (3) preferring SMS via NAS, but capable of receiving SMS via IMS, or (4) preferring SMS via IMS, but capable of receiving SMS via NAS. In one implementation, the SMS domain preference IE may be configured as a two-bit field similar to the voice domain preference IE that is provided in 3GPP TS 24.167. Thus, the SMS domain preference IE may be structured as follows:

Bit
2 1
0 0 NAS SMS delivery only
0 1 IMS SMS delivery only
1 0 NAS delivery preferred, IMS delivery as secondary
1 1 IMS delivery preferred, NAS delivery as secondary
MS only supporting IMS voice shall indicate "IMS SMS delivery only"

In another implementation described further herein, NAS protocol stack 320 may provide an SMS domain preference via a protocol configuration option (PCO) information element. NAS protocol stack 320 may provide the SMS domain preference IE to MME 132 (or another network element within EPC 130) within an attach request, tracking area update request, or PDN connectivity request. MME 132 may decide optimal routing for SMS traffic to UE 110 based on the received SMS domain preference IE.

As shown in FIG. 3, UE 110-2 may include IMS client 330. IMS client 330 may initiate sessions (e.g., session initiation protocol (SIP) sessions) to enable sending/receiving of audio, video, and/or text messages by UE 110. Particularly, according to implementations described herein, IMS client 330 may support sending and receiving of SMS messages via IMS network 140.

FIG. 3 shows exemplary components of UE 110, in other implementations, UE 110 may include different or additional components. As an example, in some implementations, UE 110 may include NAS stack 320 and/or IMS client 330 within a larger operating system.

Figure 4:
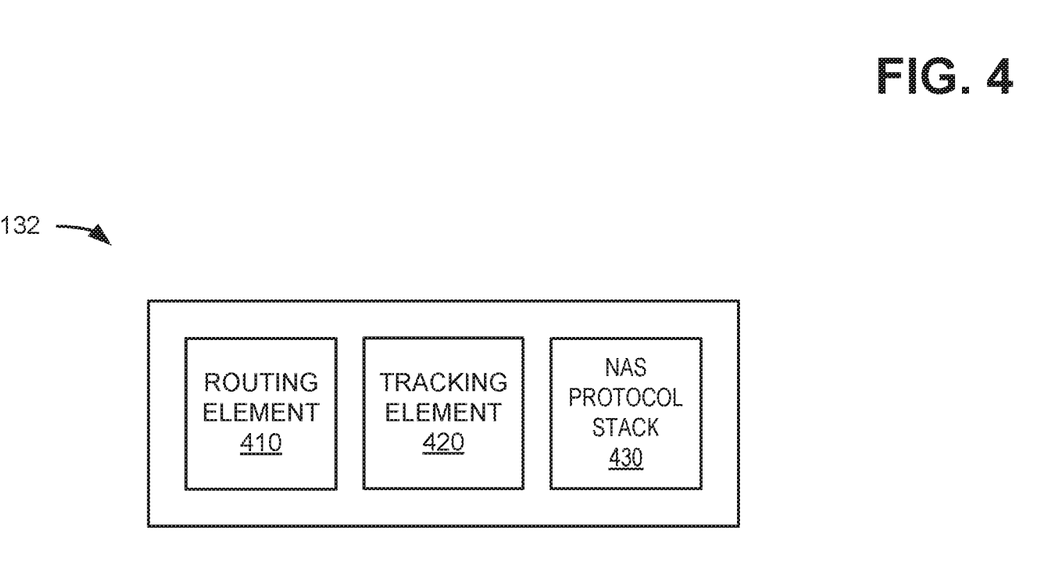
FIG. 4 is a diagram of exemplary components of a mobility management entity (MME) of FIG. 1.

FIG. 4 is a block diagram of exemplary components of MME 132 that may be implemented using one or more components of device 200 (FIG. 2). Some or all of the blocks of FIG. 4 may be included, for example in in memory 230 and executed by processor 220. As shown in FIG. 4, MME 132 may include a routing element 410, a tracking module 420, and an NAS protocol stack 430.

Routing element 410 may include hardware or a combination of hardware and software to determine routing methods for SMS traffic to/from a particular UE that is attached to EPC network 130. According to implementations described herein, routing element 410 may decide the optimal routing for SMS traffic to and from UE 110 based on determination of the SMS delivery methods (i.e., IMS SMS or NAS SMS) available to UE 110.

Tracking element 420 maintains information regarding a current state (e.g., powered on, location, etc.) of each UE 110 attached to EPC 130. For an idle state UE 110, tracking element 420 may terminate a downlink data path and may trigger paging when downlink data arrives for UE 110. Tracking element 420 may provide an idle mode user equipment tracking and paging procedure that includes retransmissions. Tracking element 420 may manage tracking areas and tracking area lists for UE 110. A tracking area may be a static defined group, or set, of eNBs 122 configured on tracking element 420. A tracking area list may be a list of tracking areas visited by a UE 110. Tracking element 420 may dynamically create the tracking area list based on tracking area updates (TAUs) sent to MME 132 as a UE 110 moves from one eNB 122 (e.g., within one tracking area) to another eNB 122 (in another tracking area).

NAS protocol stack 430 may receive and interpret an SMS domain preference IE within an attach request, tracking area update (TAU) request, or PDN connectivity request from UE 110. MME 132 may decide optimal routing for SMS traffic to UE 110 based on the received SMS domain preference IE.

FIG. 4 shows exemplary components of MME 132, in other implementations, MME 132 may include different or additional components. As an example, in some implementations, MME 132 may authenticate a mobile device user via communications with the HSS 142, and may interface with non-LTE radio access networks.

Figure 5:
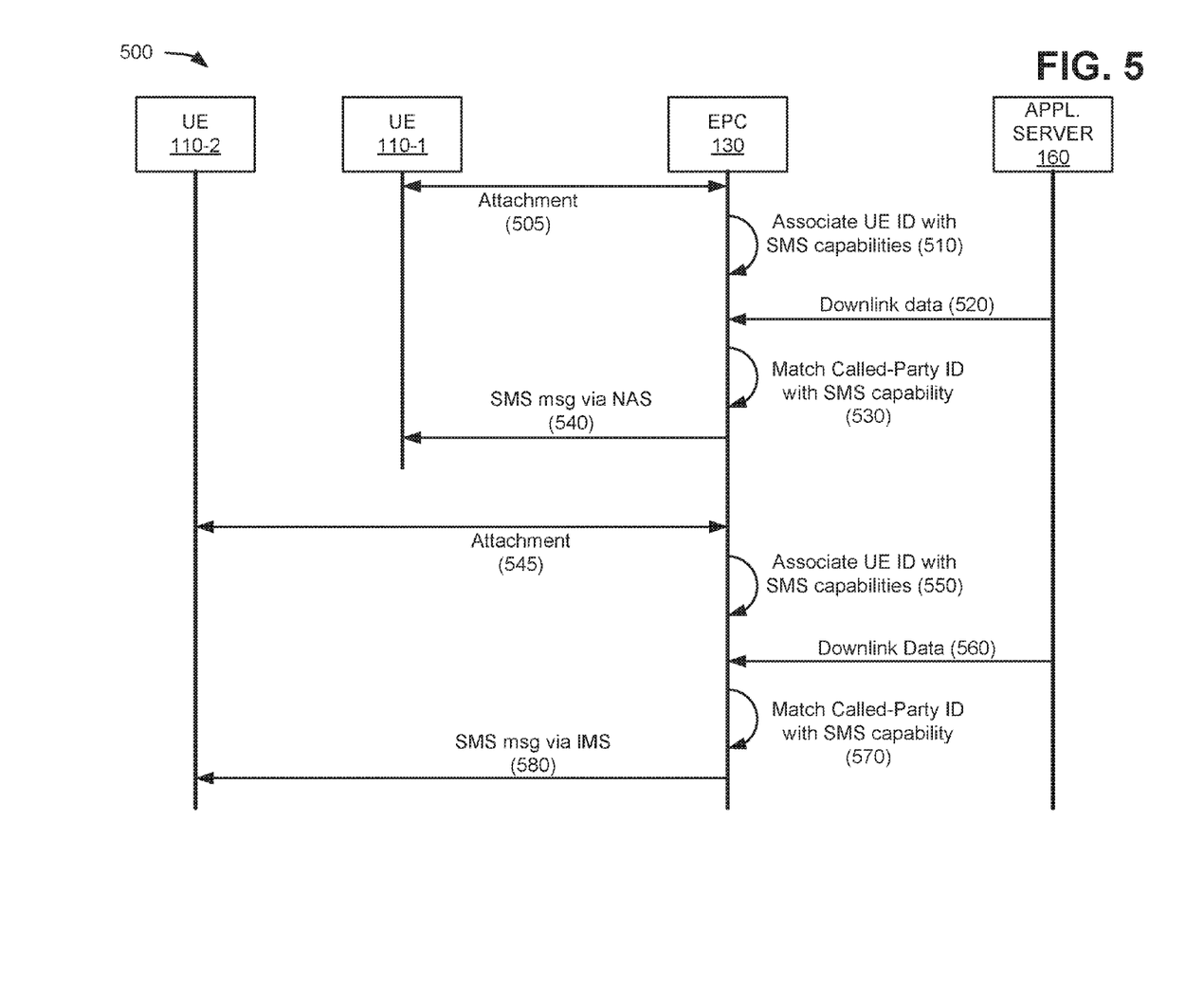
FIG. 5 is a simplified diagram of exemplary communications for sending SMS messages to a wireless device in a portion of the network of FIG. 1.

FIG. 5 is a diagram of exemplary communications among components of a portion 500 of network 100 according to an implementation described herein. Communications in FIG. 5 may illustrate differentiation of SMS capabilities for UEs. As shown in FIG. 5, network portion 500 may include UE 110-1, UE 110-2, EPC 130, and application server 160. In the example of FIG. 5, UE 110-1 may have SMS via NAS capabilities only, and UE 110-2 may have SMS over IMS capabilities with SMS via NAS as a secondary option.

UE 110-1 and EPC 130 may perform an initial network attachment procedure in which UE 110-1 is connected to EPC 130 via eNB 122 (not shown), as indicated by reference number 505. As shown at reference number 510, EPC 130 may associate a UE identifier with particular SMS capabilities at the time of attachment. As described further herein, UE 110-1 may advertise its SMS capabilities to EPC 130 as part of a network attachment procedure and/or EPC 130 may retrieve stored information about the SMS capability of UE 110-1 from a back-end database. Thus, EPC 130 may associate UE 110-1 with NAS SMS delivery only.

After attachment 505, EPC 130 may receive downlink data 520 initiated, for example, from application server 160. Downlink data 520 may require EPC network 130 to wake up an application (e.g., application 310) on UE 110-1 by providing an SMS message with a particular format. In response to data downlink request 520, EPC network 130 may buffer downlink data 520 and match the called-party ID of UE 110-1 with the previously-identified SMS capability (i.e., NAS SMS) for UE 110-1, as indicated by reference 530.

Based on the SMS capability of UE 110-1, EPC 130 may provide an SMS message 540 (e.g., an SMS wake-up message for the particular application associated with downlink data 520) via NAS. SMS message 540 may be processed by UE 110-1, causing UE 110-1 to activate application 310 be able to receive downlink data 520.

UE 110-2 and EPC 130 may perform an initial network attachment procedure in which UE 110-2 is connected to EPC 130 via eNB 122 (not shown), as indicated by reference number 545. Similar to reference number 510, EPC 130 may associate a UE identifier with particular SMS capabilities of UE 110-2 at the time of attachment. Thus, EPC 130 may associate UE 110-2 with IMS delivery preferred.

After attachment 545, EPC 130 may receive downlink data 560 initiated, for example, from application server 160. Downlink data 560 may require EPC network 130 to wake up an application (e.g., another application 310) on UE 110-2 by providing an SMS message with a particular format. In response, EPC network 130 may buffer downlink data 560 and match the called-party ID of UE 110-2 with the previously-identified SMS capability (i.e., IMS delivery preferred) for UE 110-2, as indicated by reference 570. Based on the SMS capability of UE 110-2, EPC may provide an SMS message 580 via IMS. SMS message 540 may be processed by UE 110-2, causing UE 110-2 to activate application 310 be able to receive downlink data 560.

Figure 6:
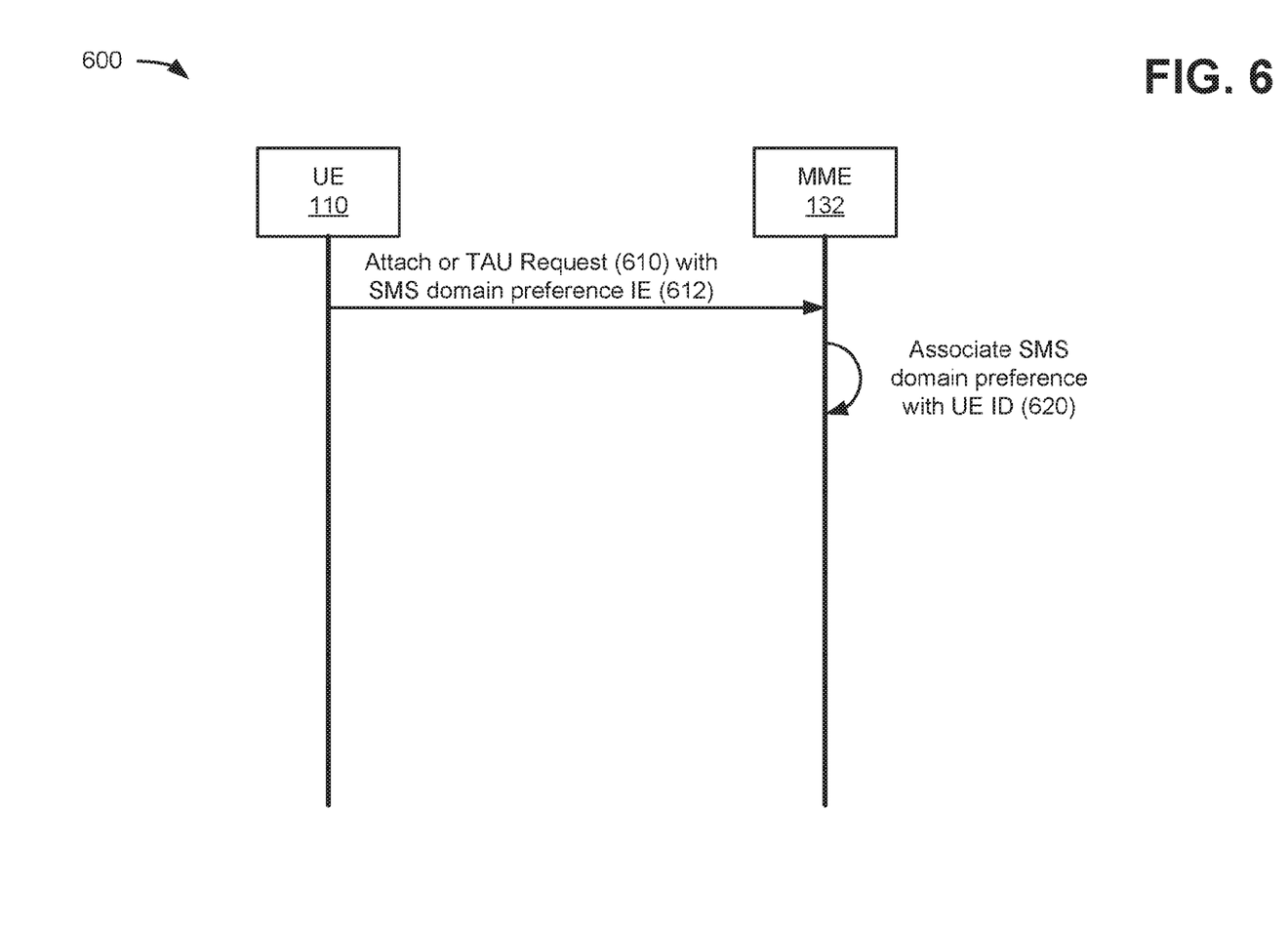
FIG. 6 is a simplified diagram of exemplary communications among devices in another portion of the network of FIG. 1, according to an implementation described herein.

FIG. 6 is a diagram of exemplary communications among devices in another portion 600 of network 100. Communications in FIG. 6 may illustrate application of an SMS domain preference information element to advertise SMS capabilities of a UE. As shown in FIG. 6, network portion 600 may include UE 110 and EPC 130.

If FIG. 6, UE 110 may send an attach or TAU request 610 via eNB 122 (not shown) to EPC 130 (e.g., MME 132). Request 610 may include an SMS domain preference IE 612 that identifies UE 110 SMS capabilities. For example, SMS domain preference IE 612 may indicate that UE 110 is capable of receiving SMS via NAS only. Alternatively, SMS domain preference IE 612 may indicate that UE 110 is capable of receiving SMS via IMS only, prefers SMS via NAS, or prefers SMS via IMS. MME 132 may receive request 610 and, as indicated by reference number 620, may associate the SMS domain preference with an identifier for UE 110. The identifier may include, for example, an international mobile station equipment identity (IMEI), a mobile device number (MDN), a mobile subscriber identification number (MSIN), an international mobile subscriber identity (IMSI), a temporary mobile subscriber identity (TMSI), a media access control (MAC) address, internet protocol (IP) address, or other data that may be associated with UE 110.

After MME 132 associates the SMS domain preference with an identifier for UE 110, EPC 130 may receive a data downlink request initiated, for example, by application server 160 (not shown in FIG. 6). As described in connection with FIG. 5, the data downlink request (e.g., data downlink request 520 or data downlink request 560) may require EPC network 130 to wake up an application (e.g., application 310) on UE 110 by providing an SMS message with a particular format. In response to the data downlink request, EPC network 130 may match the called-party ID in the data downlink request with the SMS capability for UE 110 that was indicated in SMS domain preference IE. Assuming, for example, the SMS domain preference IE was for SMS via NAS, EPC 130 may then direct the optimal routing for an SMS message via NAS to UE 110.

Figure 7:
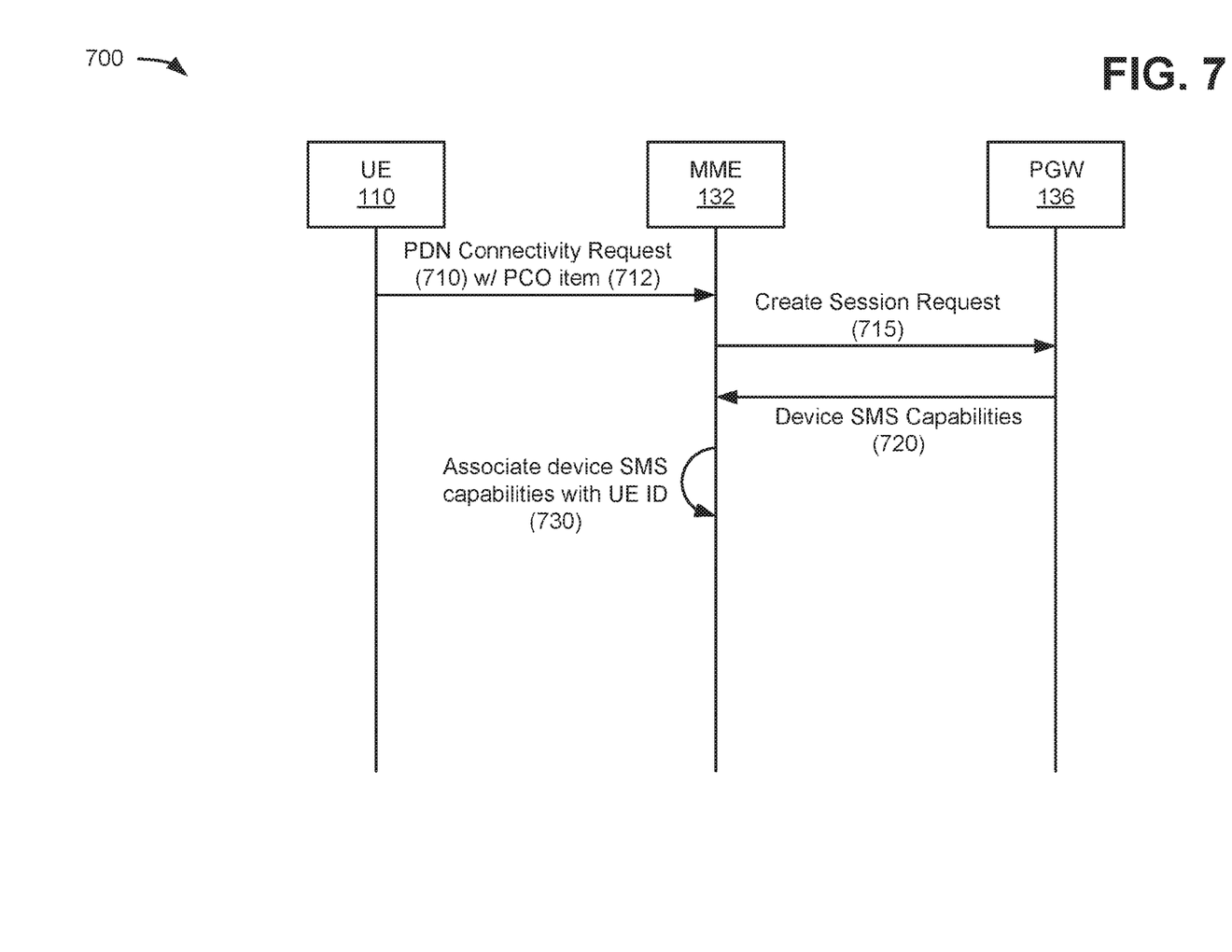
FIG. 7 is a simplified diagram of exemplary communications among devices in a further portion of the network of FIG. 1, according to an implementation described herein.

FIG. 7 is a simplified diagram of exemplary communications among devices in another portion 700 of network 100. Communications in FIG. 7 may illustrate application of a protocol configuration option (PCO) information element to advertise SMS capabilities of a UE. As shown in FIG. 7, network portion 700 may include UE 110, MME 132, and PGW 136.

In FIG. 7, UE 110 may send a PDN connectivity request 710 via eNB 122 (not shown) to PGW 136. PDN connectivity request 710 may include a PCO item 712, which may be configured similarly to other PCO items designated under 3GPP TS 24.0008, version 11.16.0. PCO item 712 may identify SMS capabilities of UE 110. In one implementation, PCO item 712 may include a newly-designated container ID, which may be included, for example, in a new version of 3GPP TS 24.0008. In another implementation, PCO item 712 may include a PCO container ID that has been previously designated as reserved for operator use. For example, PCO item 712 may use container ID FF00H (of 3GPP TS 24.0008 Table 10.5.154) or another container ID that may be configured by a service provider specifically for designating an SMS domain preference. In an implementation, the size of PCO container 712 may be zero, and the presence of PCO container 712 in PDN connectivity request 710 would indicate a data centric device which only supports SMS over NAS. Correspondingly, the absence of PCO container 712 in PDN connectivity request 710 may indicate a default capability of SMS over IMS. In another implementation, PCO container 712 size may include a non-zero value to indicate one of multiple SMS domain preferences, such as NAS SMS delivery only; IMS SMS delivery only; NAS delivery preferred, IMS delivery as secondary; and IMS delivery preferred, NAS delivery as secondary.

MME 132 may receive PDN connectivity request 710 with PCO item 712 and, in response, send a create session request 715 to PGW 136. Create session request 715 may contain pertinent information from PDN connectivity request 710 (including PCO item 712). PGW 136 may receive create session request 715 and relay a corresponding SMS domain preference for UE 110 to a primary routing element (e.g., MME 132) to decide the optimal routing for SMS traffic for UE 110. For the example of FIG. 7, PGW 136 may detect the PCO item from create session request 715 and provide a device SMS capabilities message 720 to MME 132 to indicate a preference of SMS over NAS for UE 110. Alternatively, if PGW 136 did not detect a PCO item create session request 715, PGW 136 may provide a different device SMS capabilities message 720 to MME 132 to indicate a preference of SMS over IMS for UE 110.

MME 132 may receive device SMS capabilities message 720 and, as indicated by reference number 730, may associate the SMS domain preference with an identifier for UE 110. As described in connection with FIG. 5, EPC 130 may eventually receive a data downlink request initiated, for example, by application server 160. The data downlink request (e.g., data downlink request 520 or data downlink request 560) may require EPC network 130 to wake up an application (e.g., application 310) on UE 110 by providing an SMS message with a particular format. In response to the data downlink request, EPC network 130 may match the called-party ID in the data downlink request with the SMS capability for UE 110 that was indicated in SMS domain preference IE. Assuming, for example, the SMS domain preference was for SMS via NAS, EPC 130 may then direct the optimal routing for an SMS message via NAS to UE 110.

Figure 8:
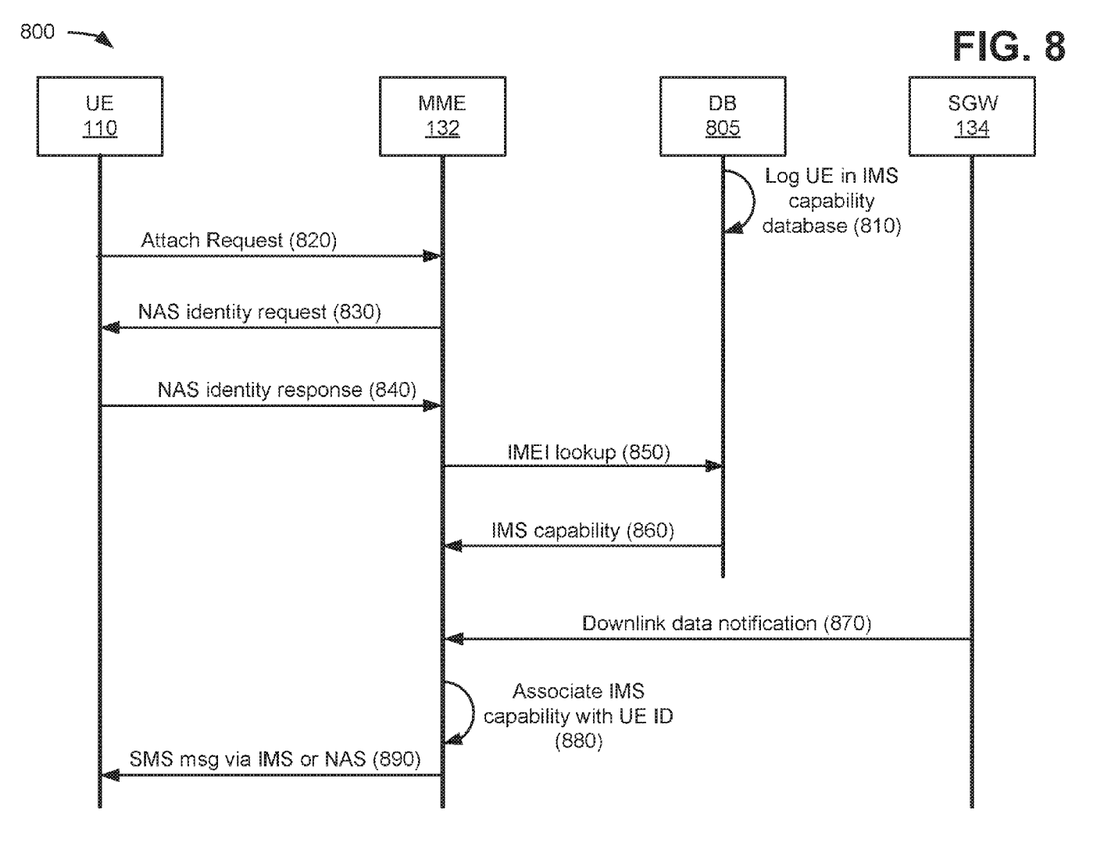
FIG. 8 is a simplified diagram of exemplary communications among devices in still another portion of the network of FIG. 1, according to an implementation described herein.

FIG. 8 is a simplified diagram of exemplary communications among devices in another portion 800 of network 100. Communications in FIG. 8 may illustrate application of an SMS capabilities database in EPC network 130. As shown in FIG. 8, network portion 800 may include UE 110, MME 132, SGW 134, and an IMS capabilities database 805.

As shown at reference number 810 of FIG. 8, a service provider may log UE 110 in IMS capabilities database 805. IMS capabilities database 805 may be a device-driven database within EPC network 130. IMS capabilities database 805 may include one or more memories. IMS capabilities database 805 may store a UE identifier (e.g., an IMEI) and SMS domain preferences such as, for example, an IMS capability associated with each UE 110. In one implementation, an IMS capability may include a binary entry, such as IMS-yes or IMS-no. In another implementation, an IMS capability may include one of four configurations particular to SMS, such as: (1) capable of receiving SMS via NAS only, (2) capable of receiving SMS via IMS only, (3) preferring SMS via NAS, but capable of receiving SMS via IMS, or (4) preferring SMS via IMS, but capable of receiving SMS via NAS.

In one implementation, IMS capabilities database 805 may be populated by having the original equipment manufacturer (OEM) provide the IMS capabilities of UE 110 to the service provider when the UE 110 (with its corresponding IMEI or another identifier) is provided to (or registered with) the service provider. In another implementation, IMS capabilities database 805 may be initially populated by the service provider using OEM information and then updated/confirmed via SMS domain preference indications from UE 110 (e.g., IE 612 in attach or TAU request 610, or PCO container 712 in PDN connectivity request 710).

After UE 110 is logged in IMS capabilities database 805, UE 110 may submit an attach request 820 to MME 132. Attach request 820 may cause MME 132 to initiate an NAS identity request 830 and receive an NAS identity response 840. NAS identity response 840 may include the IMEI for UE 110. MME 132 may then use the IMEI from NAS identity response 840 to initiate an IMEI lookup 850 in IMS capabilities database 805 and retrieve an IMS capability 860 for UE 110.

After retrieving IMS capability 860 from IMS capabilities database 805, MME 132 (or another network device in EPC 130) may receive a downlink data notification 870 from SGW 134, based on receipt of data from application server 160 (not shown). Downlink data notification 870 may require EPC network 130 to wake up an application (e.g., application 310) on UE 110 by providing an SMS message.

In response, MME 132 may match the called-party ID of UE 110 with the previously-identified IMS capability for UE 110, as indicated by reference 880. Based on the IMS capability of UE 110, EPC may provide an SMS message 890 via one of IMS or NAS to wake up the particular application.

Figure 9:
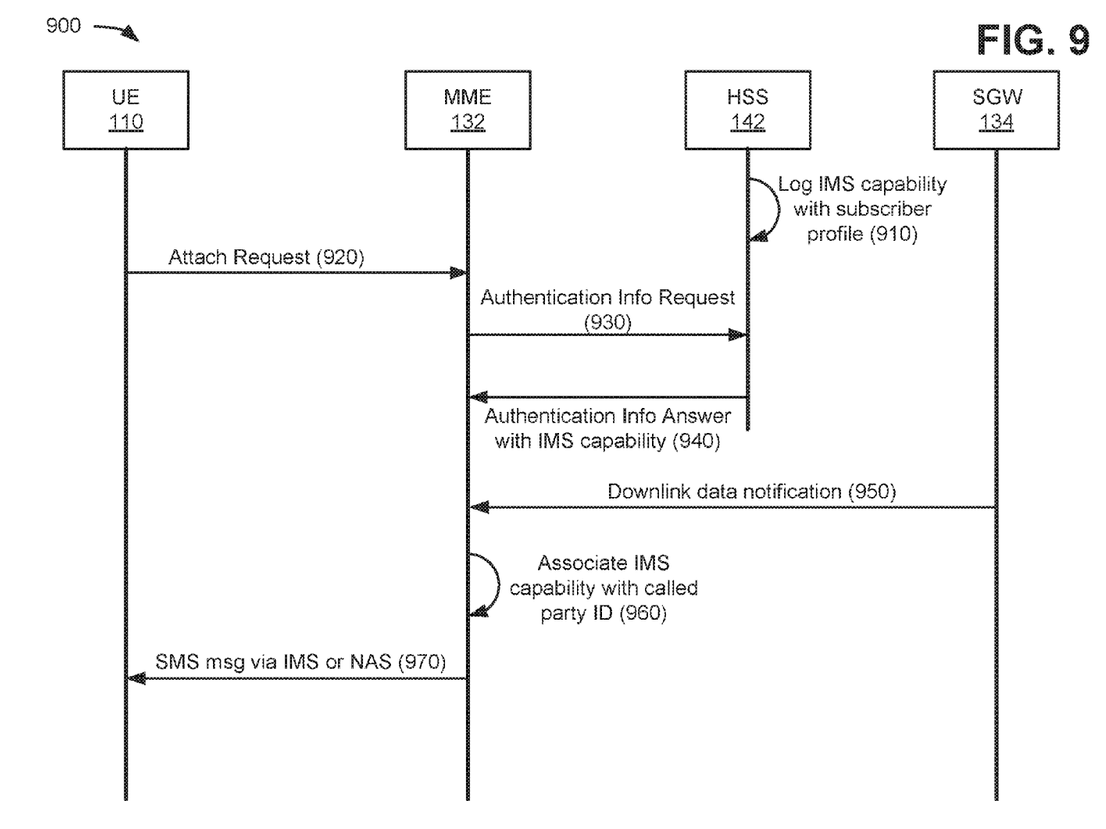
FIG. 9 is a simplified diagram of exemplary communications among devices in another portion of the network of FIG. 1, according to an implementation described herein.

FIG. 9 is a simplified diagram of exemplary communications among devices in another portion 900 of network 100. Communications in FIG. 9 may illustrate application of SMS capabilities included within a subscriber profile. As shown in FIG. 9, network portion 900 may include UE 110, MME 132, HSS 142, and application server 160.

As shown at reference number 910 of FIG. 9, a service provider may log IMS capabilities associated with UE 110 in a subscriber profile associated with HSS 142. The subscriber profile may be created when a subscriber creates a service account with the service provider. IMS capabilities in the subscriber profile may be updated, for example, when a subscriber's secure element (SE) is moved from one device (e.g., UE 110) to another device (another UE 110). The secure element may include, for example, a Universal Integrated Circuit Card (UICC), a removable user identity module (R-UIM), a subscriber identity module (SIM), a universal subscriber identity module (USIM), or an Internet Protocol (IP) multimedia services identity module (ISIM). The IM capabilities in the subscriber profile may include an SMS domain preference such as, for example, an IMS capability associated with a subscriber's UE 110. The IMS capability may include, for example, a binary entry or one of the four configurations particular to SMS described above in connection with database 805.

After the IMS capabilities of UE 110 are logged with the subscriber profile of HSS 142, UE 110 may submit an attach request 920 to MME 132. Attach request 920 may cause MME 132 to initiate an authentication information request 930 to HSS 142 and receive an authentication information answer 940 with profile data including the IMS capability of UE 110. After receiving answer 940 from HSS 142, MME 132 (or another network device in EPC 130) may receive a downlink data notification 950 from SGW 134. Downlink data notification 950 may be initiated, for example, in response to downlink data from application server 160. Downlink data notification 950 may require EPC network 130 to wake up an application (e.g., application 310) on UE 110 by providing an SMS message. In response to downlink data notification 950, MME 132 may match the called-party ID of UE 110 with the previously-identified IMS capability for UE 110, as indicated by reference 960. Based on the IMS capability of UE 110, EPC may provide an SMS message 890 via one of IMS or NAS to wake up the particular application.

FIGS. 6-9 show exemplary communications among devices in network 100 to identify an SMS domain preference for a particular UE 110. In other implementations, different or additional communications may be used. For example, in another implementation, advertisements from UE 110 to indicate an SMS domain preference (e.g., IE 612 in attach request 610, PCO container 712 in PDN connectivity request 710, etc.) may be used in combination with IMS capabilities database 805 or HSS 142 profiles. Thus, MME 132 or HSS 142 can validate an SMS domain preference provided by UE 110 against previously-stored records.

Figure 10:
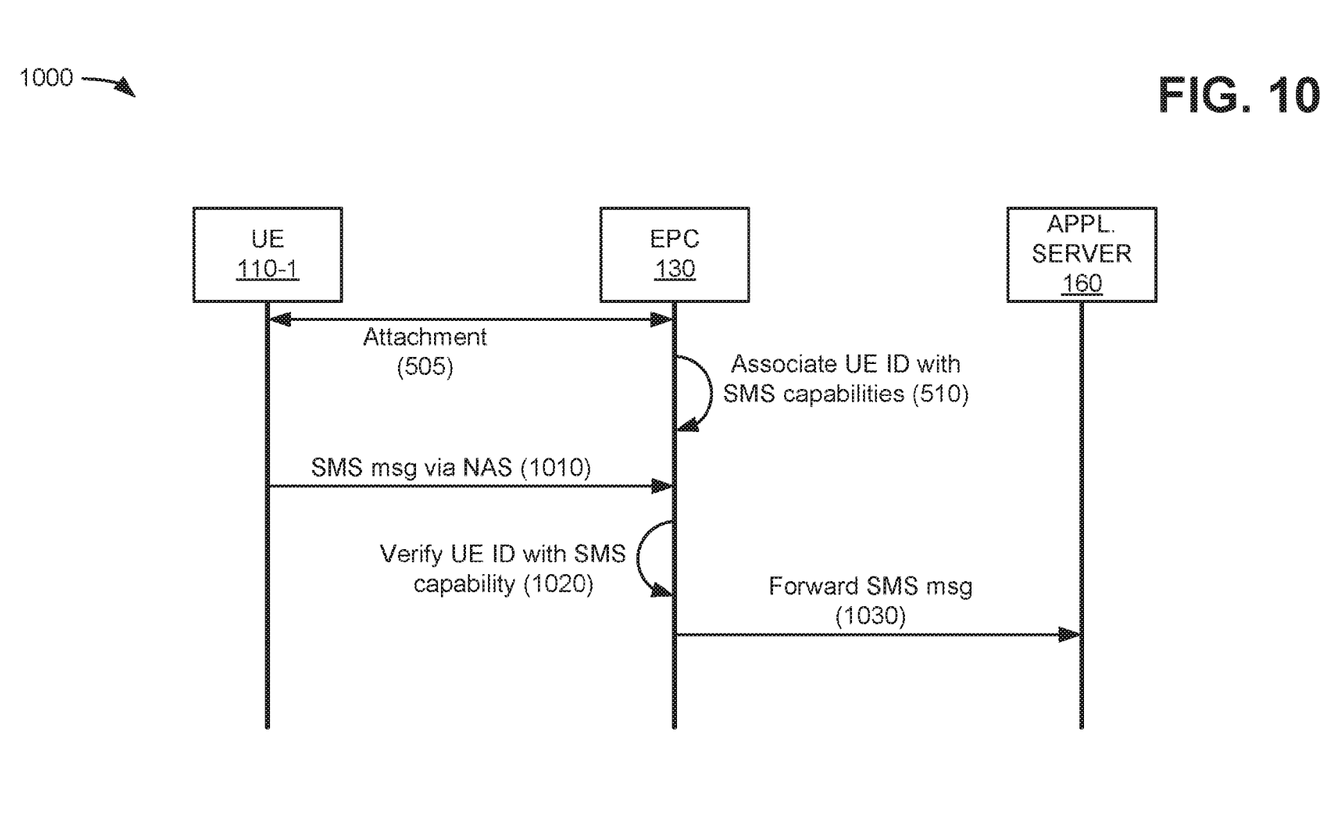
FIG. 10 is a simplified diagram of exemplary communications for receiving SMS messages from a wireless device in a portion of the network of FIG. 1.

FIG. 10 is a diagram of other exemplary communications among components of 1000 portion 500 of network 100 according to another implementation described herein. Communications in FIG. 10 may illustrate capabilities for UEs to send outgoing SMS messages. As shown in FIG. 10, network portion 1000 may include UE 110-1, EPC 130, and application server 160. In the example of FIG. 10, UE 110-1 may have SMS via NAS capabilities only.

In a similar manner as described in connection with FIG. 5 above, in FIG. 10 UE 110-1 and EPC 130 may perform an initial network attachment procedure in which UE 110-1 is connected to EPC 130 via eNB 122 (not shown), as indicated by reference number 505. As shown at reference number 510, EPC 130 may associate a UE identifier with particular SMS capabilities at the time of attachment. As described herein, UE 110-1 may advertise its SMS capabilities to EPC 130 as part of a network attachment procedure and/or EPC 130 may retrieve stored information about the SMS capability of UE 110-1 from a back-end database. Thus, EPC 130 may associate UE 110-1 with NAS SMS delivery only.

After attachment 505 and association 510, UE 110-1 may send SMS message 1010 via NAS directed to, for example, application server 160. EPC network 130 may receive SMS message 1010 and verify that UE 110-1 is associated with NAS SMS delivery, as indicated by reference number 1020. Assuming EPC 130 determines that UE 110-1 is verified, EPC 130 will forward the SMS message to application server 160, as indicated by reference number 1030. For example, EPC 130 may forward SMS message 1010 to application server 160 via wired or wireless protocols.

In another implementation (not shown), a UE 110 (e.g., UE 110-2) may perform an initial network attachment procedure in which UE 110 is associated with NAS IMS delivery, such that EPC 130 may receive an SMS message from UE 110 via IMS and forward the SMS message to application server 160.

Figure 11:
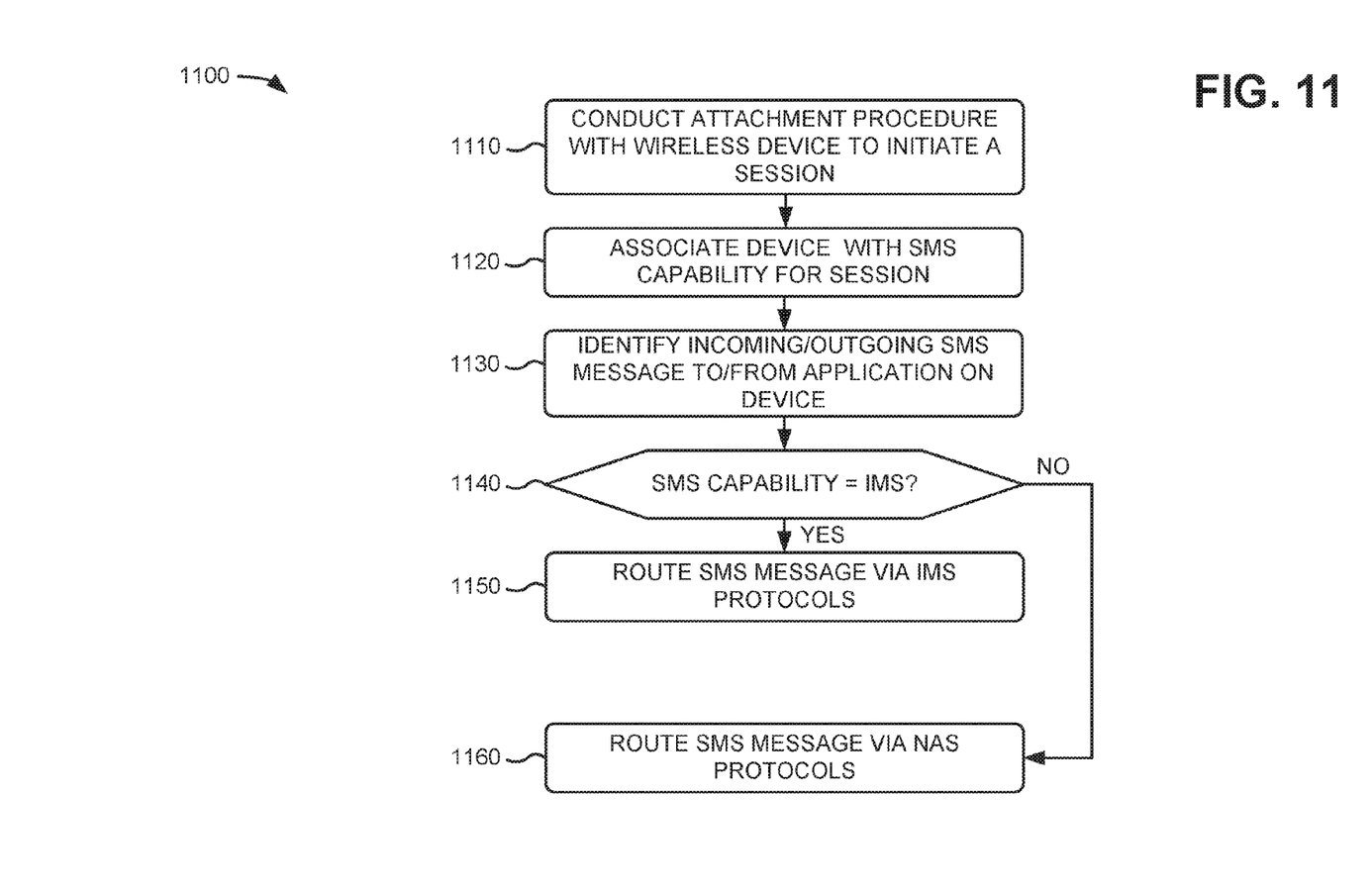
FIG. 11 is a flow chart of an exemplary process of identifying an SMS domain preference for a user device according to an implementation described herein.

FIG. 11 is a flow chart of an exemplary process for identifying an SMS domain preference according to an implementation described herein. In one implementation, process 1100 may be performed by MME 132. In another implementation, process 1100 may be performed by MME 132 in conjunction with one or more other devices of EPC network 130. Process 1100 is described with reference to components in figures described above.

As shown in FIG. 11, process 1100 may include conducting an attachment procedure with a device to initiate a session (block 1110) and associating the device with an SMS capability for the session (block 1120). For example, MME 132 may conduct an attachment procedure with UE 110 to initiate a wireless communication session. In one implementation, as shown in FIG. 6, MME 132 may identify an SMS capability for the session based on an SMS domain preference included in an information element of an attach request or a TAU request from UE 110. In another implementation, as shown in FIG. 7, MME 132 may receive an SMS capability for the session based on an SMS domain preference indicated by a PCO item of a PDN connectivity request from the UE 110. In other implementations, MME 132 may obtain a previously-stored record of the SMS capability for UE 110 from database 805 or from HSS 142.

Process 1100 may also include identifying an incoming SMS message for an application on the device (block 1130), and determining if the device has capability to process IMS protocols (block 1140). For example, application server 160 may provide downlink data 520 or downlink data 560 that requires EPC network 130 to wake up an application (e.g., application 310) on UE 110 by providing an SMS message with a particular format. In response to data downlink request 520/560, MME 132 may match the called-party ID of UE 110 with the previously-identified SMS capability (i.e., SMS via NAS or SMS via IMS) for UE 110.

If the device has capability to process IMS protocols (block 1140—yes), MME 132 may route the SMS message via IMS protocols (block 1150). For example, when UE 110-2 is associated with a preference for IMS protocols, MME 132 may provide the SMS message to UE 110-2 via IMS. If the device does not have capability to process IMS protocols (block 1140—no), MME 132 may route the SMS message via NAS protocols (block 1160). For example, when UE 110-1 is associated with a preference for NAS protocols, MME 132 may provide an SMS message to UE 110-1 via NAS.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 11 the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
conducting, by a network device of a core network, an attachment procedure with a wireless device, wherein the conducting forms a session between the wireless device and the core network;
associating, by the network device, the wireless device with a short message service (SMS) capability for the session, wherein the SMS capability indicates whether the wireless device can process SMS messages via Internet protocol Multimedia Subsystem (IMS) protocols;
identifying, by the network device, an SMS message intended for an application residing on the wireless device;
routing, by the network device, the SMS message via IMS protocols when the SMS capability of the wireless device indicates the wireless device can process IMS protocols; and
routing, by the network device, the SMS message via non-access stratum (NAS) protocols when the SMS capability of the wireless device indicates the wireless device cannot process IMS protocols.

2. The method of claim 1, further comprising:
receiving, by the network device, an identifier of the wireless device and an indication of downlink data for the application residing on the wireless device; and
matching, by the network device and in response to the receiving, the SMS capability to the identifier of the wireless device.

3. The method of claim 1, the conducting comprising:
receiving, from the wireless device, one of an attach request or a tracking area update (TAU) request, the attach request or the TAU request including an information element with an SMS domain preference.

4. The method of claim 3, wherein the SMS domain preference indicates the wireless device is one of:
capable of receiving SMS via NAS only;
capable of receiving SMS via IMS only;
preferring SMS via NAS, but capable of receiving SMS via IMS; and
preferring SMS via IMS, but capable of receiving SMS via NAS.

5. The method of claim 1, the conducting comprising:
receiving, from the wireless device, a packet data network (PDN) connectivity request, the PDN connectivity request including an information element with an SMS domain preference.

6. The method of claim 5, wherein the information element includes a protocol configuration option (PCO) container to indicate the SMS domain preference as one of the SMS capability of receiving SMS via NAS or the SMS capability of receiving SMS via IMS.

7. The method of claim 6, wherein the PCO container is an operator-reserved PCO container with a container size of zero.

8. The method of claim 1, further comprising:
logging, in a database of the core network, the SMS capability of the wireless device.

9. The method of claim 8, the conducting comprising:
obtaining, by the network device and from the wireless device, an International Mobile station Equipment Identity (IMEI) of the wireless device; and
matching, by the network device, the SMS capability with the IMEI using the database.

10. The method of claim 8, wherein the logging includes importing, from original equipment manufacturer (OEM)

data and prior to the conducting, an IMS capability for the wireless device and a device identifier for the wireless device.

11. The method of claim 1, the conducting comprising:
obtaining, by the network device and from a home subscriber server (HSS), the SMS capability of the wireless device.

12. The method of claim 11, further comprising:
adding to a subscriber profile of the HSS, prior to the conducting, an IMS capability for the wireless device; and
updating the subscriber profile when a secure element for the subscriber is moved to another wireless device.

13. A network device in a core network, comprising:
one or more memories to store instructions; and
one or more processors configured to execute instructions in the one or more memories to:
   conduct an attachment procedure with a wireless device, wherein the conducting forms a session between the wireless device and the core network;
   associate the wireless device with a short message service (SMS) capability for the session, wherein the SMS capability indicates whether the wireless device can process SMS messages via Internet protocol Multimedia Subsystem (IMS) protocols;
   identify an SMS message intended for an application residing on the wireless device;
   route the SMS message via IMS protocols when the SMS capability of the wireless device indicates the wireless device can process IMS protocols; and
   route the SMS message via non-access stratum (NAS) protocols when the SMS capability of the wireless device indicates the wireless device cannot process IMS protocols.

14. The network device of claim 13, wherein the network device is a mobility management entity (MME) for an evolved packet core (EPC) network.

15. The network device of claim 13, wherein, when associating the wireless device with the SMS capability for the session, the one or more processors are further to:
store in the one or more memories the SMS capability and the identifier of the wireless device.

16. The network device of claim 13, wherein the identifier of the wireless device comprises one or more of:
an international mobile station equipment identity (IMEI),
a mobile device number (MDN),
a mobile subscriber identification number (MSIN),
an international mobile subscriber identity (IMSI),
a temporary mobile subscriber identity (TMSI),
a media access control (MAC) address, and
internet protocol (IP) address.

17. The network device of claim 13, wherein, when conducting the attachment procedure, the one or more processors are further to one of:
receive, from the wireless device, a packet data network (PDN) connectivity request that includes an information element with an SMS domain preference; or
receive, from the wireless device, one of an attach request or a tracking area update (TAU) request, the attach request or the TAU request including an information element with the SMS domain preference.

18. The network device of claim 13, wherein the one or more processors are further to:
log, in a database of the core network, the SMS capability of the wireless device before conducting the attachment procedure; or
store, in a memory of a home subscriber server (HSS), the SMS capability of the wireless device before conducting the attachment procedure.

19. A tangible non-transitory computer-readable medium comprising computer-executable instructions, the computer-readable medium comprising one or more instructions to:
conduct an attachment procedure with a wireless device, wherein the conducting forms a session between the wireless device and a core network;
associate the wireless device with a short message service (SMS) capability for the session, wherein the SMS capability indicates whether the wireless device can process SMS messages via Internet protocol Multimedia Subsystem (IMS) protocols;
identify an SMS message intended for an application residing on the wireless device;
route the SMS message via IMS protocols when the SMS capability of the wireless device indicates the wireless device can process IMS protocols; and
route the SMS message via non-access stratum (NAS) protocols when the SMS capability of the wireless device indicates the wireless device cannot process IMS protocols.

20. The tangible non-transitory computer-readable medium of claim 19, further comprising one or more instructions to:
receive, from the wireless device, one of:
   a packet data network (PDN) connectivity request that includes an information element with an SMS domain preference, or
   an attach request that includes a protocol configuration option (PCO) container indicating the SMS domain preference; and
log, in a database of the core network, the SMS capability of the wireless device.

* * * * *